United States Patent
Ito

(10) Patent No.: US 9,908,681 B2
(45) Date of Patent: Mar. 6, 2018

(54) FOOD DEGASSING BAG

(71) Applicant: W & Co., Shibuya-ku, Tokyo (JP)

(72) Inventor: Hiroyuki Ito, Tokyo (JP)

(73) Assignee: W & Co., Shibuya-ku, Tokyo (JP)

( * ) Notice: Subject to any disclaimer, the term of this patent is extended or adjusted under 35 U.S.C. 154(b) by 0 days.

(21) Appl. No.: 14/975,867

(22) Filed: Dec. 21, 2015

(65) Prior Publication Data

US 2016/0185504 A1    Jun. 30, 2016

(30) Foreign Application Priority Data

Dec. 26, 2014 (JP) ................................. 2014-263982

(51) Int. Cl.
| | |
|---|---|
| *B65D 33/01* | (2006.01) |
| *B65D 81/26* | (2006.01) |
| *B65D 65/38* | (2006.01) |
| *B65D 30/08* | (2006.01) |

(52) U.S. Cl.
CPC .......... *B65D 81/263* (2013.01); *B65D 31/02* (2013.01); *B65D 33/01* (2013.01); *B65D 65/38* (2013.01); *B65D 2565/387* (2013.01); *Y02W 30/806* (2015.05)

(58) Field of Classification Search
CPC ............ B65D 2205/00; B65D 2205/02; B65D 2205/025; B65D 33/01; B65D 75/225
See application file for complete search history.

(56) References Cited

U.S. PATENT DOCUMENTS

| | | | | |
|---|---|---|---|---|
| 4,206,870 A | * | 6/1980 | DeVries | B65D 33/01 137/845 |
| 4,672,684 A | * | 6/1987 | Barnes | B65D 33/01 383/102 |
| 4,743,123 A | * | 5/1988 | Legters | B65D 33/01 131/281 |
| 5,399,022 A | * | 3/1995 | Sheets | B65D 33/01 383/103 |

(Continued)

FOREIGN PATENT DOCUMENTS

| | | |
|---|---|---|
| JP | 10-167335 A | 6/1998 |
| JP | 3184474 U | 6/2013 |
| WO | WO 9959897 A2 * | 11/1999 ......... B65D 81/3415 |

OTHER PUBLICATIONS

Japanese decision to grant a patent dated Jun. 3, 2015.

*Primary Examiner* — Jes F Pascua
*Assistant Examiner* — Nina Attel
(74) *Attorney, Agent, or Firm* — Studebaker & Brackett PC

(57) ABSTRACT

Provided is a food degassing bag which has a stable gas venting operation in response to carbon dioxide gas produced in different amounts and by which a gas venting effect can be obtained even when the internal pressure of a storage bag is low.

The storage bag is composed of a packaging film layer 1 and a degassing layer 2. A polyethylene layer 2A and an oxygen barrier layer 2B compose the degassing layer 2. In the degassing layer 2, gas venting through-pores 4 are opened. An adhesive layer 3 adheres the packaging film layer 1 and the polyethylene layer 2A of the degassing layer 2 together. The adhesive layer 3 is formed sequentially with non-adhesive portions showing a stripe pattern. The non-adhesive portions form degassing vents leading to the outside of the storage bag.

9 Claims, 3 Drawing Sheets

(56) References Cited

U.S. PATENT DOCUMENTS

| | | | | |
|---|---|---|---|---|
| 5,988,881 A | * | 11/1999 | Sutherland | B65D 33/01 |
| | | | | 383/103 |
| 6,182,850 B1 | * | 2/2001 | Marbler | B65D 77/225 |
| | | | | 220/359.3 |
| 2006/0037884 A1 | * | 2/2006 | Doyle | B65B 1/24 |
| | | | | 206/524.8 |
| 2008/0273820 A1 | * | 11/2008 | Wiker | B29D 7/01 |
| | | | | 383/103 |
| 2014/0029873 A1 | * | 1/2014 | Cruz | B65B 9/20 |
| | | | | 383/45 |

* cited by examiner

FOOD DEGASSING BAG

CROSS-REFERENCES TO RELATED APPLICATIONS

This patent specification is based on Japanese patent application, No. 2014-263982 filed on Dec. 26, 2014 in the Japan Patent Office, the entire contents of which are incorporated by reference herein.

BACKGROUND OF THE INVENTION

1. Field of the Invention

The present invention relates to a food degassing bag for storing food such as coffee beans and miso, and relates to a food degassing bag capable of degassing carbon dioxide gas produced from food in a packaged state.

2. Description of the Related Art

For example, when coffee beans are bagged, carbon dioxide gas produced from the coffee beans may fill the bag to rupture the bag. Therefore, conventionally, a special valve has been attached to the bag to perform appropriate gas ventilation so as to adjust the internal pressure of the bag.

Such a bag attached with a special valve is bulky in valve configuration, which causes an inconvenience that unevenness is formed on the bag surface. Moreover, because the valve as a separate member is attached to the bag, the manufacturing cost becomes extremely high.

On the other hand, Patent Document 1 describes a packaging bag having a gas venting operation. For this packaging bag, a non-breathable outer film having oxygen barrier properties and a breathable inner film that transmits oxygen are overlaid on top of each other, and a gas venting pore portion is provided in the outer film.

However, the packaging bag described in Document 1, for which the inner film with breathability is overlaid on the outer film having oxygen barrier properties, has thus required many steps for manufacturing the films having a gas venting operation.

The present applicant has therefore proposed earlier, as described in Patent Document 2, a food degassing bag for which a gas venting pore portion is formed to penetrate through one of the packaging films in a part where inner films of packaging films to form a bag body are joined to each other.

With this food degassing bag, because no pore portion is formed in a main body part of the bag body, it has succeeded in providing a food degassing bag with improved appearance. Also, because the pore portion is formed in the part where inner films are joined to each other, the possibility that the pore portion is deformed is also eliminated.

[Patent Document 1] Japanese Published Unexamined Patent Application No. H10-167335
[Patent Document 2] Japanese Utility Model Registration No. 3184474

BRIEF SUMMARY OF THE INVENTION

However, for the food degassing bag described in Patent Document 2, because the gas venting pore portion that is formed to penetrate through a packaging film is made to penetrate through one of the packaging films in the joined part, it has been necessary to make the pore portion penetrate partially through the two overlapping films by laser processing. Therefore, there has been a problem that the laser processing is difficult, so that the processing of the pore portion is not stable.

Moreover, with the gas venting pore portion partially arranged, degassing cannot be performed until the internal pressure reaches 25 atm or more, so that it has been difficult to perform degassing in response to carbon dioxide gas produced in different amounts in accordance with coffee beans, fermented food, etc.

Therefore, the present invention has been created in order to solve the problems described above, and an object thereof is to provide a food degassing bag which has a stable gas venting operation in response to carbon dioxide gas produced in different amounts and also by which a gas venting effect can be obtained even when the internal pressure of a storage bag is low.

In order to achieve the above-described object, a first means of the present invention is a food degassing bag for which a storage bag 10 that is sealed by heat sealing is composed of a packaging film layer 1 and a degassing layer 2 adhered to an inner side of the packaging film layer 1, in which the degassing layer 2 is composed of a polyethylene layer 2A and an oxygen barrier layer 2B and provided with gas venting through-pores 4 opened penetrating through the degassing layer 2, an adhesive layer 3 that adheres the packaging film layer 1 and the oxygen barrier layer 2B of the degassing layer 2 together is formed sequentially with non-adhesive portions 3B showing a stripe pattern, and the non-adhesive portions 3B form degassing vents leading to the outside of the storage bag 10.

In a second means, the adhesive layer 3 has an area ratio set to 3 to 2, of adhesive portions 3A applied with an adhesive and non-adhesive portions 3B applied with no adhesive.

The non-adhesive portions 3B of a third means show 0.25 mm to 0.35 mm-wide band shapes, and the through-pores 4 are formed as 2 mm-wide and 3 mm-long pores penetrating through the degassing layer 2 at intervals of 4 mm therearound.

In a fourth means, the oxygen barrier layer 2B is formed by a vapor deposited aluminum layer or a vapor deposited silica layer.

As in claim 1, by the degassing layer 2 being composed of a polyethylene layer 2A and an oxygen barrier layer 2B and being provided with gas venting through-pores 4 opened penetrating through the degassing layer 2, an adhesive layer 3 that adheres the packaging film layer 1 and the polyethylene layer 2A of the degassing layer 2 together being formed sequentially with non-adhesive portions 3B showing a stripe pattern, and the non-adhesive portions 3B forming degassing vents leading to the outside of the storage bag 10, a gas venting effect can be obtained regardless of changes in the internal pressure of the storage bag 10. Consequently, stable gas ventilation is enabled in response to carbon dioxide gas produced in different amounts.

As with claim 2, by providing the adhesive layer 3 having an area ratio set to 3 to 2, of adhesive portions 3A applied with an adhesive and non-adhesive portions 3B applied with no adhesive, performing degassing even when the internal pressure is on the order of 1 atm is enabled. Therefore, degassing can be performed in response to carbon dioxide gas produced in different amounts in accordance with coffee beans, fermented food, etc.

As in claim 3, by the non-adhesive portions 3B showing 0.25 mm to 0.35 mm-wide band shapes and the through-pores 4 being formed as 2 mm-wide and 3 mm-long pores penetrating through the degassing layer 2 at intervals of 4 mm therearound, even when the internal pressure of the storage bag 10 rises, the degassing layer 2 does not separate from the packaging film layer 1, and moreover, it becomes possible to always perform stable degassing in response to changes in internal pressure.

As with claim 4, by forming the oxygen barrier layer 2B by a vapor deposited aluminum layer or a vapor deposited silica layer, a sufficient oxygen barrier effect can be obtained. Also, forming the oxygen barrier layer 2B by a vapor deposited aluminum layer provides characteristics particularly excellent in light blocking properties, which therefore makes it possible to suppress foodstuffs that are easily degraded by light and fermented food such as miso from fermenting.

DETAILED DESCRIPTION OF THE INVENTION

The present invention has thus realized the original object such as having a stable gas venting operation in response to carbon dioxide gas produced in different amounts and also allowing to obtain a gas venting effect even when the internal pressure of the storage bag is low.

Figure 1:
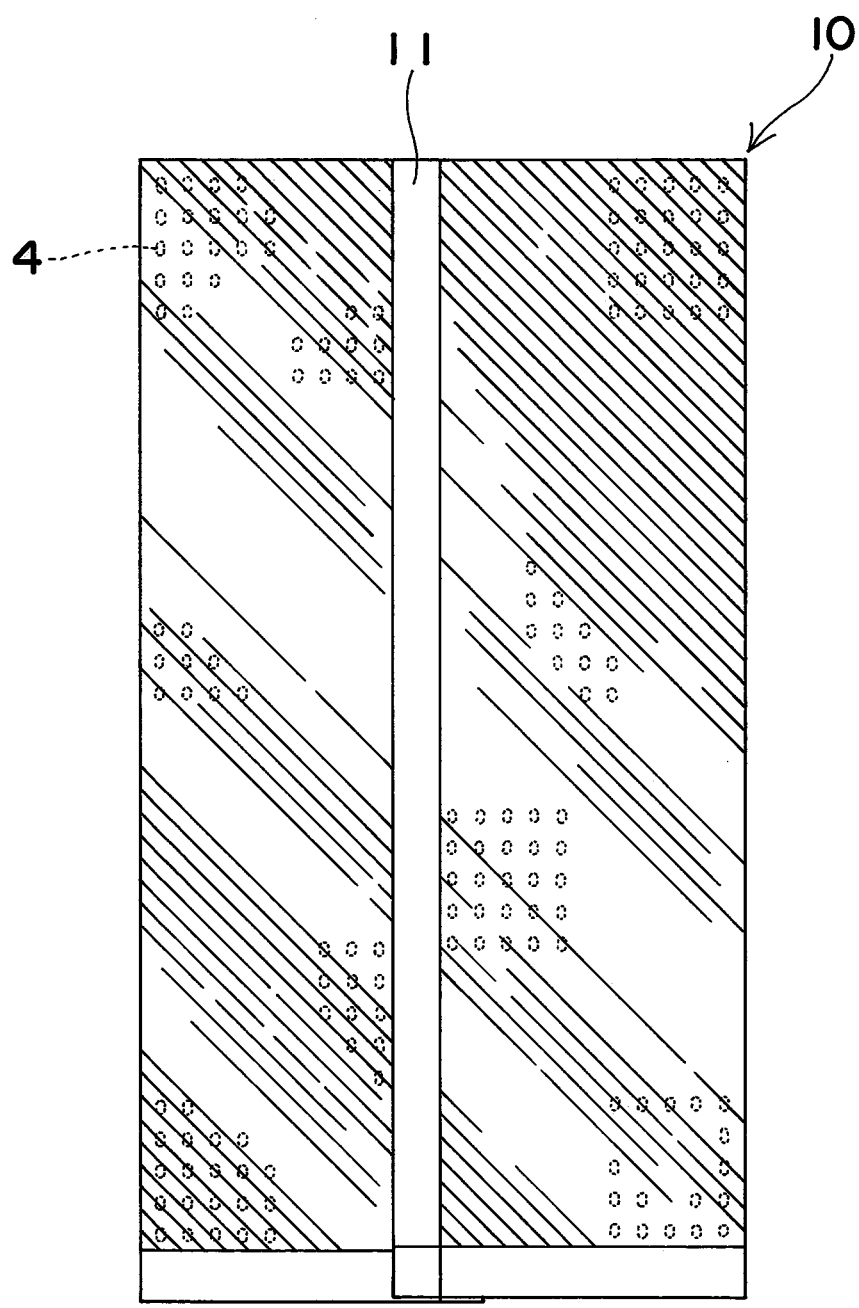
FIG. 1 is a back view showing an example of a bag body of the present invention.

Hereinafter, an example of the present invention will be described. Reference symbol 10 shown in the figures denotes a storage bag which stores food that produces carbon dioxide gas such as coffee beans or miso (refer to FIG. 1). The storage bag 10 is composed of a packaging film layer 1 and a multi-layered degassing layer 2 adhered to an inner side of the packaging film 1, and is closed by heat sealing.

The packaging film layer 1 is formed of polyester with a printing 1A, and the multi-layered degassing layer 2 is adhered via an adhesive layer 3 to the inner side of the packaging film layer 1.

The degassing layer 2 has a two-layer structure in which a polyethylene layer 2A and an oxygen barrier layer 2B are laminated. Because polyethylene is a breathable material, gas produced inside the storage bag 10 is transmitted through the polyethylene layer 2A to be discharged. On the other hand, the oxygen barrier layer 2B is formed of a material having high gas barrier properties, and is formed by a vapor deposited aluminum layer or a vapor deposited silica layer. Using a vapor deposited aluminum layer for the oxygen barrier layer 2B also enables sealing in the aroma of coffee beans, tea leaves, or the like.

Figure 2:
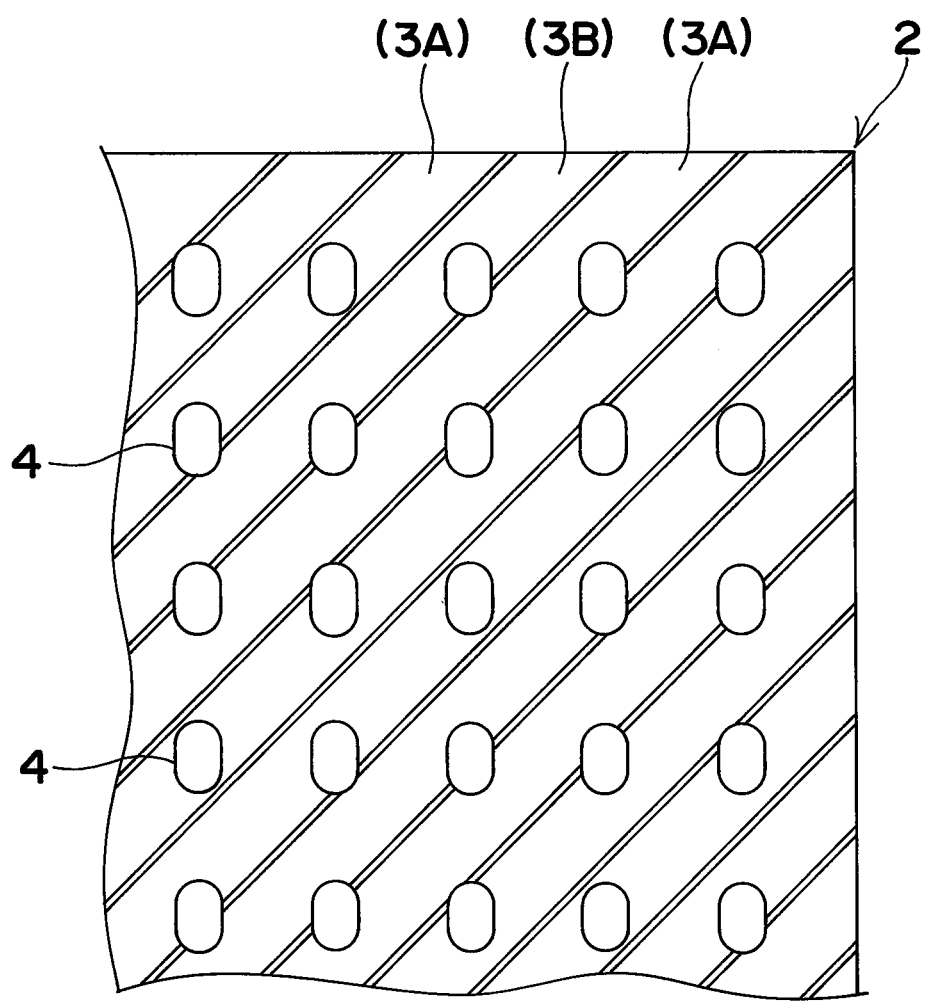
FIG. 2 is a sectional view of the main part of the present invention in a state where a pore portion is formed to penetrate through a degassing layer.

Also, in the degassing layer 2, gas venting through-pores 4 penetrating through the degassing layer 2 are opened in advance (refer to FIG. 2). The through-pores 4 are by penetrating through the polyethylene layer 2A and the oxygen barrier layer 2B by means of laser light irradiated toward the degassing layer 2. The illustrated through-pores 4 are formed as 2 mm-wide and 3 mm-long pores penetrating through the degassing layer 2 at intervals of 4 mm therearound. Moreover, the adhesive layer 3 is provided on the oxygen barrier layer 2B of the degassing layer 2 to be adhered to the packaging film layer 1. In addition, the through-pores 4 can be set in arbitrary shapes such as elliptic or oblong shapes.

The adhesive layer 3 is a layer that adheres the oxygen barrier layer 2B and the packaging film layer 1 together, and is applied at a side close to the oxygen barrier layer 2B with a pressure sensitive adhesive. This adhesive layer 3 shows a striped shape by adhesive portions 3A applied with the pressure sensitive adhesive and non-adhesive portions 3B applied with no pressure sensitive adhesive (refer to FIG. 2). The non-adhesive portions 3B form degassing vents leading to the outside of the storage bag 10.

The adhesive portions 3A of the adhesive layer 3 are applied with a pressure sensitive adhesive and dried, and then overlaid with the packaging film layer 1 and the degassing layer 2 and wound up by a roll to be pressurized for adhesion. On the other hand, the non-adhesive portions 3B are in a simply pressure-fitted state because no pressure sensitive adhesive is applied thereto.

In the adhesive layer 3 thus configured, the adhesive portions 3A and the non-adhesive portions 3B are set to 3 to 2 in area ratio. According to experimentation, sufficient degassing could not be performed when the area ratio of the adhesive portions 3A and the non-adhesive portions 3B was set to 2 to 1. It was revealed as well when the area ratio of the adhesive portions 3A and the non-adhesive portions 3B was set to 1 to 1 that the adhesion strength declines. Further, forming the non-adhesive portions 3B in 0.25 mm to 0.35 mm-wide band shapes enabled always performing stable degassing in response to changes in internal pressure. At this time, the through-pores 4 were formed as 2 mm-wide and 3 mm-long pores at intervals of 4 mm therearound.

Figure 3:
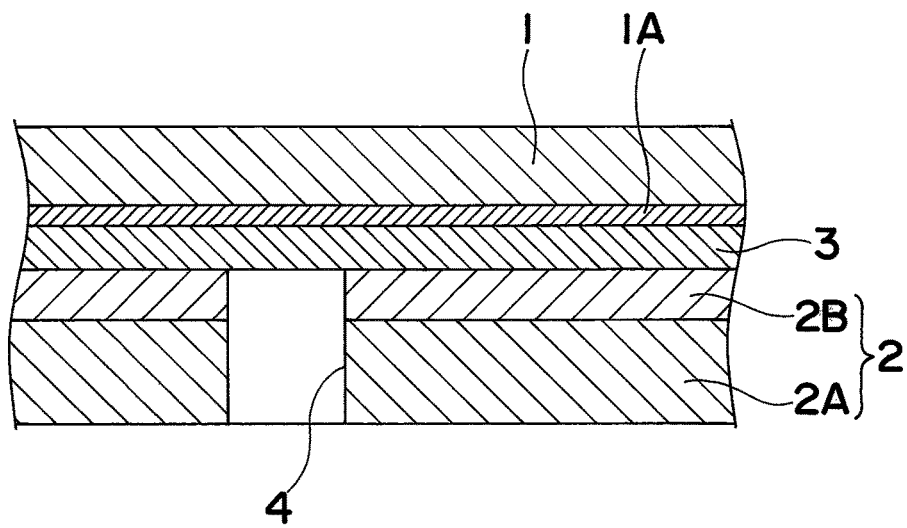
FIG. 3 is a sectional view of the main part of the present invention showing an example of a bag body of the present invention.
Figure 4:
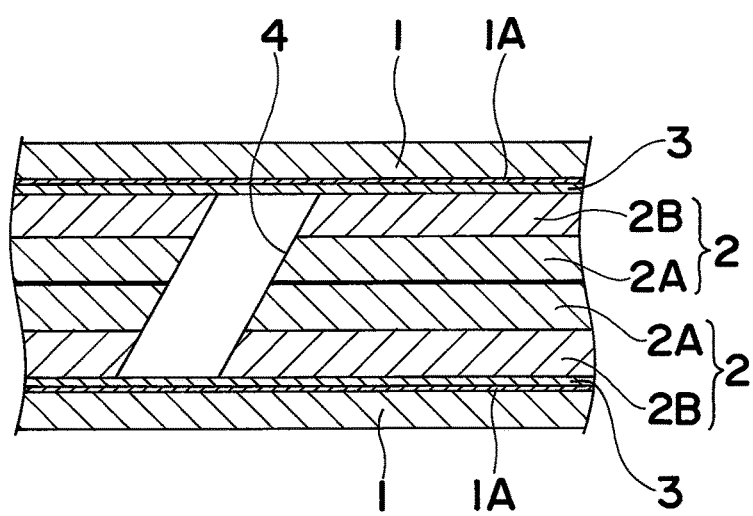
FIG. 4 is a sectional view of the main part of the present invention showing a state in which the degassing layers are put together at a heat seal portion.

According to the present invention, gas produced inside the storage bag 10 reaches the adhesive layer 3 through the through-pores 4 penetrating through the degassing layer 2 to be discharged externally form the non-adhesive portions 3B of the adhesive layer 3 (refer to FIG. 3). Also as in a back portion of the storage bag 10, putting the polyethylene layers 2A of the degassing layers 2 together to form a heat seal portion 11 results in a structure having a higher degassing ability because the through-pores 4 and the polyethylene layers 2A are overlaid (refer to FIG. 4).

In addition, the storage bag 10 is not limited in shape to the illustrated example, and the present invention can be applied as long as it is a storage bag 10 having a multi-layered structure of the packaging film layer 1 and the degassing layer 2, such as, for example, a storage bag 10 provided at a bottom portion and side faces thereof with gussets. Also, as the food to be stored in the storage bag 10, a wide variety of food that produces carbon dioxide can be stored, besides coffee beans, miso, etc.

The present invention is industrially applicable because it can be valuably used for hunting or sport shooting.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

What is claimed is:

1. A degassing bag for storing food that is sealed by heat sealing at an edge portion of a sheet which is composed of a packaging film layer and a degassing layer adhered to an inner side of the packaging film layer by an adhesive layer;
   wherein the degassing layer is composed of a polyethylene layer and an oxygen barrier layer and provided with gas venting through-pores penetrating through the degassing layer;
   the adhesive layer adhering the packaging film layer and the oxygen barrier layer of the degassing layer together includes adhesive portions to which adhesive is applied and non-adhesive portions to which no adhesive is applied so as to form a plurality of degassing vents fluidly communicating with the gas venting through-pores;
   the adhesive portions and non-adhesive portions are alternately placed so as to present a stripe pattern thereby the plurality of degassing vents formed by the non-adhesive portions leads to the outside of the storage bag at the edge portion of the degassing layer sealed by heat sealing;
   longitudinal edges of the degassing layer of the degassing bag are positioned apposed one another and heat sealed along the edge portion; and
   at least a portion of the through-pores of the portion of the degassing layers heat sealed together are overlaid on one another.

2. The food degassing bag according to claim 1, wherein the adhesive layer has an area ratio set to 3 to 2, of adhesive portions applied with an adhesive and non-adhesive portions having no adhesive applied.

3. The food degassing bag according to claim 2, wherein the non-adhesive portions show 0.25 mm to 0.35 mm-wide band shapes, and the through-pores are formed as 2 mm-wide and 3 mm-long pores penetrating through the degassing layer at intervals of 4 mm therearound.

4. The food degassing bag according to claim 1, wherein the non-adhesive portions show 0.25 mm to 0.35 mm-wide band shapes, and the through-pores are formed as 2 mm-wide and 3 mm-long pores penetrating through the degassing layer at intervals of 4 mm therearound.

5. The food degassing bag according to claim 1, wherein the oxygen barrier layer is formed by a vapor deposited aluminum layer.

6. The food degassing bag according to claim 1, wherein the oxygen barrier layer is formed by a vapor deposited silica layer.

7. The food degassing bag according to claim 1, wherein said plurality of degassing vents extend at an angle with respect to the edge portion of the sheet.

8. The food degassing bag according to claim 7, wherein a longer dimension of said gas venting through-pores extends substantially parallel to the edge portion of the sheet.

9. The food degassing bag according to claim 1, wherein a longer dimension of said gas venting through-pores extends substantially parallel to the edge portion of the sheet.

* * * * *